(No Model.)
J. McLAIN.
ATTACHMENT FOR GRAIN DRILLS.
No. 335,468.   Patented Feb. 2, 1886.
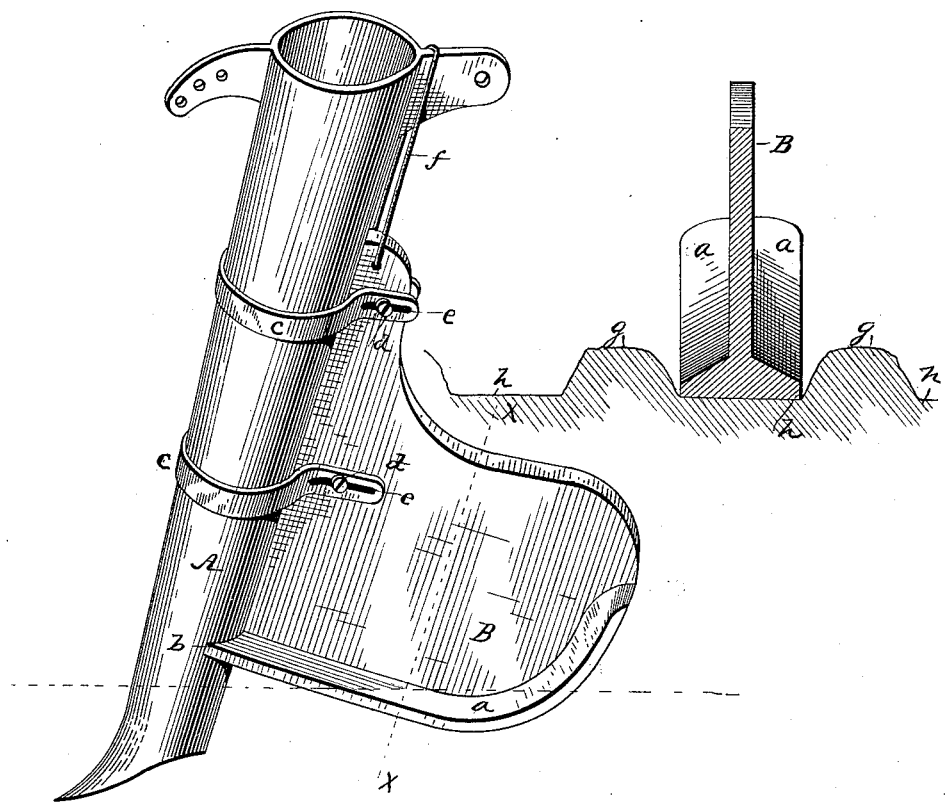
WITNESSES
Edwin L. Yewell,
James McLain.
INVENTOR
John McLain
by L. H. Ginsabaugh
Attorney

UNITED STATES PATENT OFFICE.

JOHN McLAIN, OF INDIANA, PENNSYLVANIA.

ATTACHMENT FOR GRAIN-DRILLS.

SPECIFICATION forming part of Letters Patent No. 335,468, dated February 2, 1886.

Application filed June 23, 1885. Serial No. 169,539. (No model.)

*To all whom it may concern:*

Be it known that I, JOHN MCLAIN, a citizen of the United States, residing at Indiana, in the county of Indiana and State of Pennsylvania, have invented certain new and useful Improvements in Attachments for Grain-Drills, of which the following is a specification, reference being had therein to the accompanying drawings.

My invention relates to improvements in attachments for grain-drills.

The object of my invention is to provide the hoes or teeth of grain-drills with a shoe or drag, which will regulate the depth of the hoe, and at the same time pulverize and compact the soil directly on the grain deposited by said hoes or spouts.

Referring to the drawings, Figure 1 is a side elevation of a hoe or tooth of a grain-drill with my improved drag attached thereto. Fig. 2 is a sectional end view on the line $x\ x$ of Fig. 1 of the shoe, and also an outline or profile view of the ground after the seed has been deposited therein.

A is the hoe or tooth of an ordinary grain-drill, to the rear side of which is attached the shoe or drag B. The shoe or drag B is made of the form shown, of metal or other suitable material, and is provided with flanges or wings $a$, which give to the lower edge a bearing or supporting surface. The forward end of the flanges $a$ are cut away, as shown at $b$, so they will partially surround the hoe or tooth A, and thus form a bearing-surface for the drag. The upper surface of the flange $a$ is beveled off, so as to more readily shed the soil, and the rear portion of the drag is curved upward to form a mold-board, which will force the surplus soil slightly to each side of the shoe or drag.

The shoe or drag B is adjustably secured to the hoe or tooth A by means of the metal straps $c$ and set-screws $d$, working in the slots $e$ in the ends of the straps. This adjustment regulates the depth the tooth is to be inserted in the soil, while the wire $f$ or other suitable support or stay prevents the shoe or drag and the metal straps from sliding down the tapering sides of the hoe or spout when the same is raised out of the ground. By this construction I can adjust the hoes and prevent them from running too deep, and am enabled to place the grain at a uniform depth in the soil. The shoe or drag, following the hoe, as it does, slightly compacts the soil onto the grain deposited in the furrow made by the hoe to form a gutter, $h$, while at the same time the soil is pulverized and left in ridges between the rows, as shown at $g$, Fig. 2. The ridges $g$, formed by the drag between the rows of grain, will be reduced or mellowed down by the action of the frost, thus covering the roots of the grain and preventing them from being lifted out of the soil by the action of the frost.

It will be noticed that the drag or shoe is readily placed at any desired point on the hoe or spout of the drill and rigidly held in such position, and in its sliding motion over the soil tends to push the clods and stones to one side, instead of compacting them down on the grain, as is the case when a wheel is used for that purpose.

I am aware that adjustable drags have been used; but they have been made flexible and concave or hollowed out on the under side, so as to form a ridge of soil directly over the grain, which is entirely different from the result produced by my device.

Having thus described my invention, what I claim, and desire to secure by Letters Patent, is—

1. In a grain-drill, a shoe or drag adjustably secured to the hoe or spout of the drill, as described, said shoe being provided with the wings or side extensions, $a$, having their upper surfaces beveled, whereby the earth is compacted on the grain and ridges formed between the rows, as set forth.

2. The drag or shoe B, having the front ends of the wings or extensions cut away, as described, to embrace the hoe or spout of the drill, in combination with the adjustable straps $c$ and wire or brace $f$, as set forth.

In testimony whereof I affix my signature in presence of two witnesses.

JOHN McLAIN.

Witnesses:
JOHN M. LERCH,
J. A. C. RUFFNER.